United States Patent [19]
Kozempel et al.

[11] Patent Number: 5,962,054
[45] Date of Patent: Oct. 5, 1999

[54] NON-THERMAL ENERGY TREATMENT FOR THE REDUCTION OF MICROBIAL POPULATION IN LIQUID FOOD PRODUCTS

[75] Inventors: Michael Kozempel, Hatfield; Neil Goldberg, North Wales; Richard Cook, Bethlehem; Michael Dallmer, Philadelphia, all of Pa.

[73] Assignee: The United States of America, as represented by the Secretary of Agriculture, Washington, D.C.

[21] Appl. No.: 08/946,888

[22] Filed: Oct. 8, 1997

[51] Int. Cl.$^6$ .................................. A23L 3/00; H05B 6/00
[52] U.S. Cl. ...................... 426/241; 219/731; 219/759; 422/21; 426/521
[58] Field of Search ................................ 426/241, 521, 426/522; 422/21; 219/730, 731, 759

[56] References Cited

U.S. PATENT DOCUMENTS

| | | | |
|---|---|---|---|
| Re. 30,780 | 10/1981 | Stenstrom | 219/731 |
| 2,833,657 | 5/1958 | Copson | 426/241 |
| 4,808,783 | 2/1989 | Stenstrom | 426/241 |
| 4,853,238 | 8/1989 | Huang | 426/241 |
| 4,975,246 | 12/1990 | Charm | 426/241 |

OTHER PUBLICATIONS

Merin et al., *Milchwissenschaft*, vol. 39(11), pp. 643–644, 1984.
Rosenberg et al., *Food Technology*, pp. 92–99, Jun., 1987.
Nikdel et al., *Journal of Agriculture Food Chemistry*, vol. 41, pp. 2116–2119, 1993.
Kudra et al., *Journal of Food Science*, vol. 56(4), pp. 931–937, 1991.
Ozilgen et al., *Enzyme Microbiology Technology*, vol. 13, pp. 419–423, 1991.

*Primary Examiner*—George Yeung
*Attorney, Agent, or Firm*—M. Howard Silverstein; John D. Fado; Janelle S. Graeter

[57] ABSTRACT

Conventional food treatment processes utilized for food preservation generally involve heat treatment and usually result in some degree of thermal damage. A process has been developed for the non-thermal treatment of liquid food products which results in a significant reduction in the microbial population, thus reducing spoilage and extending shelf life. The novel process involves the rapid application of electromagnetic energy (EME), such as microwave or radio frequency energy, and the simultaneous removal of any thermal energy which may be generated by the process through the use of circulating cooling medium and an efficient heat exchanger.

11 Claims, 7 Drawing Sheets fig. 1 fig. 2 fig. 3 fig. 4 fig. 5 fig. 6 fig. 7

NON-THERMAL ENERGY TREATMENT FOR THE REDUCTION OF MICROBIAL POPULATION IN LIQUID FOOD PRODUCTS

BACKGROUND OF THE INVENTION

1. Field of the Invention

Bacteria multiply rapidly in food, causing it to spoil and resulting in problems associated both with food storage and food safety. A variety of preservation techniques such as canning, freezing, drying, salting, pickling, etc. have been utilized to retard spoilage and extend shelf life. In addition, boiling will kill any bacteria present in food, but the heat required for boiling and any other process requiring heat often damages the flavor, texture and/or nutritional value of the treated foods. Pasteurization, or controlled heat, has been a particularly beneficial treatment from a food safety standpoint and is now required for many liquid foods such as milk and fruit and vegetable juices. However, it also suffers from the problems associated with heat treatments.

This invention relates to a novel liquid food treatment process which utilizes electromagnetic energy (EME), such as microwave or radio frequency energy, for effectively reducing the presence of microorganisms which cause food spoilage or damage, thus providing enhanced food preservation capability without accompanying thermal damage.

2. Description of the Related Art

Most foods interact with high frequency electromagnetic fields such as microwave energy, and a number of studies have been carried out to investigate the effects of these interactions. Results have been inconsistent, however, and there is some debate over whether there are nonthermal effects associated with microwave processing. Mudgett (1982. *Food Tech.* pp. 109–115), for example, has reported finding no nonthermal effect. Microbial survival and thermal denaturation of heat labile constituents in microwave processing were governed by the same time-temperature relationships as those in conduction heating. Moreover, Goldblith and Wang (1967. *Applied Microbiology.* pp. 1371–1375) detected no difference when they exposed suspensions of *Escherichia coli* (*E. coli*) and *Bacillus subtilis* to both conventional heating and microwave heating. In addition, Welt et al. (1994. *Applied and Environmental Microbiology.* vol. 60, no. 2, pp. 482–488) investigated the effect of sublethal temperature treatment with microwave energy on *Clostridium sporogenes* in potassium phosphate buffer. They found no additional lethality aside from the rapid heating offered by microwave radiation.

On the other hand, Webb and Dodds (1968. *Nature.* vol. 218, pp. 374–375; 1969. *Nature.* vol. 222, pp. 1199–1200) reported that cells of *E. coli* grown in nutrient broth and exposed to microwaves exhibited slowed down cell division and an inhibited metabolic process early in the life span of the cell. Culkin and Fung (1975. *J. Milk Food Technol.* vol. 38, no. 1, pp. 8–15) studied the effect of microwaves on *E. coli* and *Salmonella typhimurium* in tomato soup, vegetable soup and broth, and their data suggested that "the heat generated during the microwave exposure alone is inadequate to fully account for the nature of the lethal effects of microwaves for microorganisms". In addition, Olsen (July, 1965. *Food Engineering.* pp. 51–53) observed that the numbers of viable spores of *Aspergillus niger,* Penicillium sp. and *Rhizopus nigricans* were greatly reduced by microwaves during breadmaking.

Due in part to this controversy, little concentrated effort has been made to develop procedures which effectively utilize electromagnetic energy for purposes of reducing bacterial load and thus preserving and/or increasing the shelf life of perishable foods.

SUMMARY OF THE INVENTION

We have developed a novel process using electromagnetic energy instead of thermal energy for the treatment of liquid foods. The process combines a rapid EME input into a fluid food system with a simultaneous rapid removal of thermal energy from the system utilizing an efficient heat exchanger.

In accordance with this development it is an object of the invention to provide a novel, effective method for the treatment of fluid food products in order to reduce the amount of microorganisms in the fluid sufficient to retard spoilage and increase shelf life.

Other objects and advantages of the invention will become readily apparent from the following description.

DETAILED DESCRIPTION OF THE INVENTION

The possibility of utilizing EME in a cold non-thermal treatment process was investigated by carrying out a variety of experiments. The objective of the experiments was to determine the effectiveness of EME for killing bacteria while at the same time not subjecting the liquid containing the bacteria to damaging levels of heat. The experiments were carried out in a system, described by way of example, which utilized a double tube heat exchanger 1 fitted inside a continuous microwave dryer 2 (see FIG. 1). The outer tube 3 was transparent to EME, and the inner tube 4 was stainless steel. Cooling water flowed through the inner tube 4, while product sample liquid flowed countercurrent through the annulus 5. EME was instantly applied to the system, and heat was simultaneously removed by the cooling inner tube 4. The EME energized the process fluid but was reflected off the inner tube, which removed energy from the liquid sample to prevent a significant temperature rise. The outer tube thus served as an energy trap and the inner tube as a heat sink.

Figure 2:
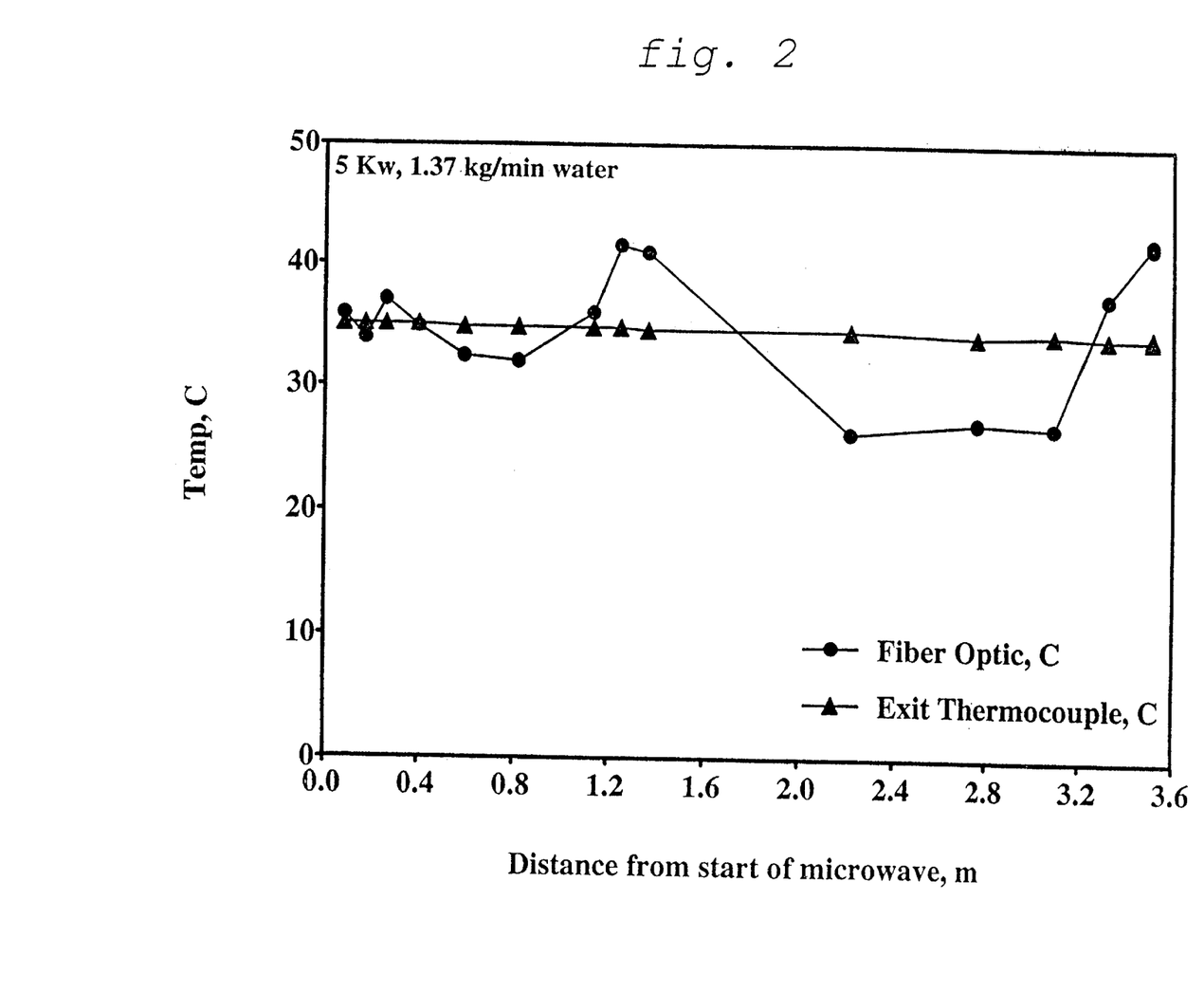
FIG. 2 shows the temperature distribution within the microwave heating zone.

A thermocouple was placed at the exit of the microwave 6, and, in order to determine the temperature distribution within the process tube in the microwave as well, a fiber optic probe was installed in the process tube. At normal steady state operating conditions, the probe was slowly moved within the tube over the length of the energy input section. The microwave energy entered the energy input section through three wave guides 7. The temperature distribution and the corresponding thermocouple reading at the exit are shown in FIG. 2. Generally, it was found that the thermocouple gave a representative reading. With the cooling tube on and under normal experimental conditions, the process fluid temperature was usually about 35° C. with a short spike at about 40° C. In two experiments, a temperature indicator label having an irreversible color indicator for 60° C. was placed in the microwave heating section. With the cooling tube on and under normal experimental conditions, the indicator did not change color, confirming that the process fluid did not reach 60° C.

Figure 3:
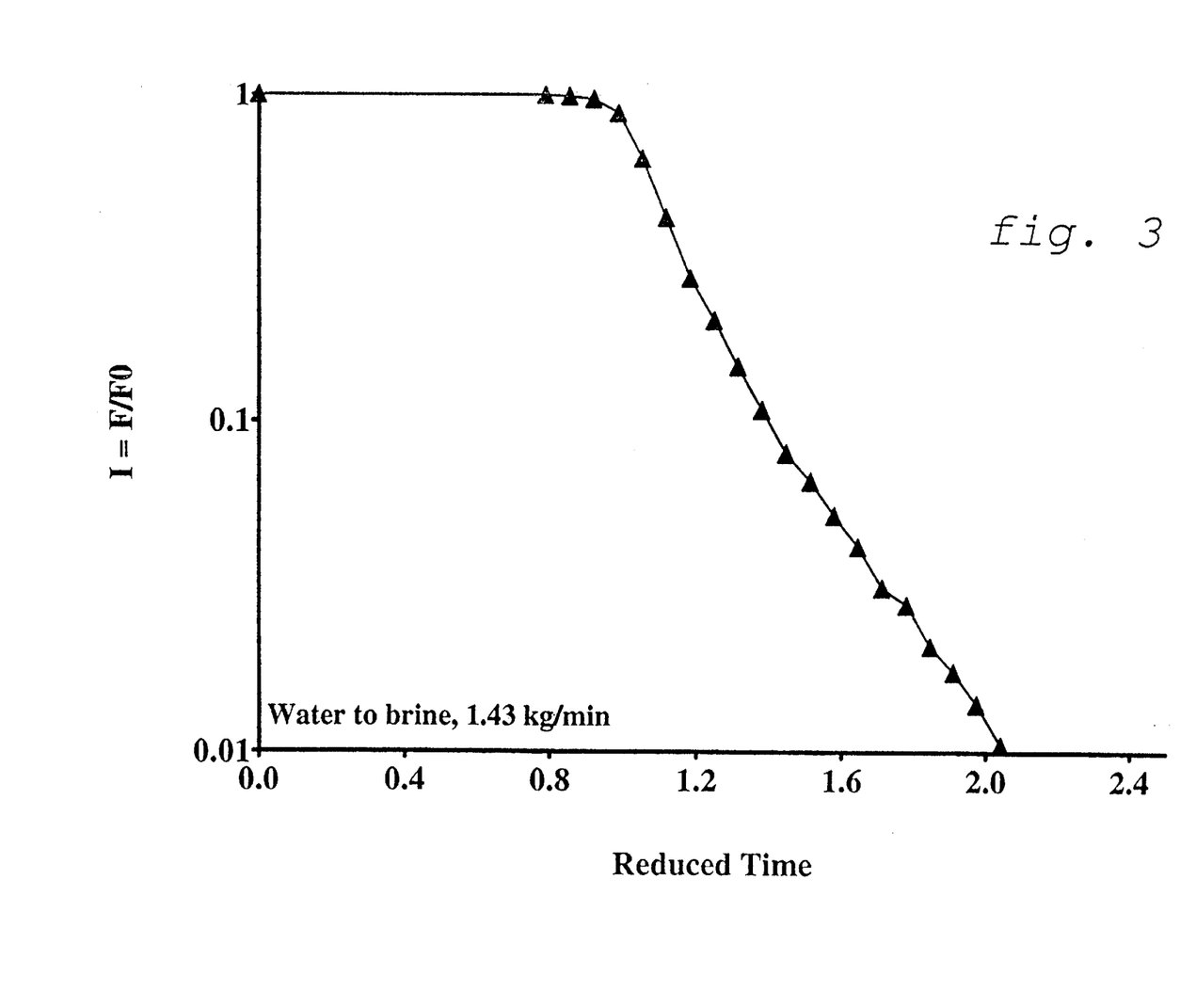
FIG. 3 shows the residence time distribution through the microwave.

A residence time distribution study was carried out at a flow rate of 1.453 kg/min. The process was started on tap water and then switched to brine. As shown in FIG. 3, the process is about 90% plug flow.

Figure 1:
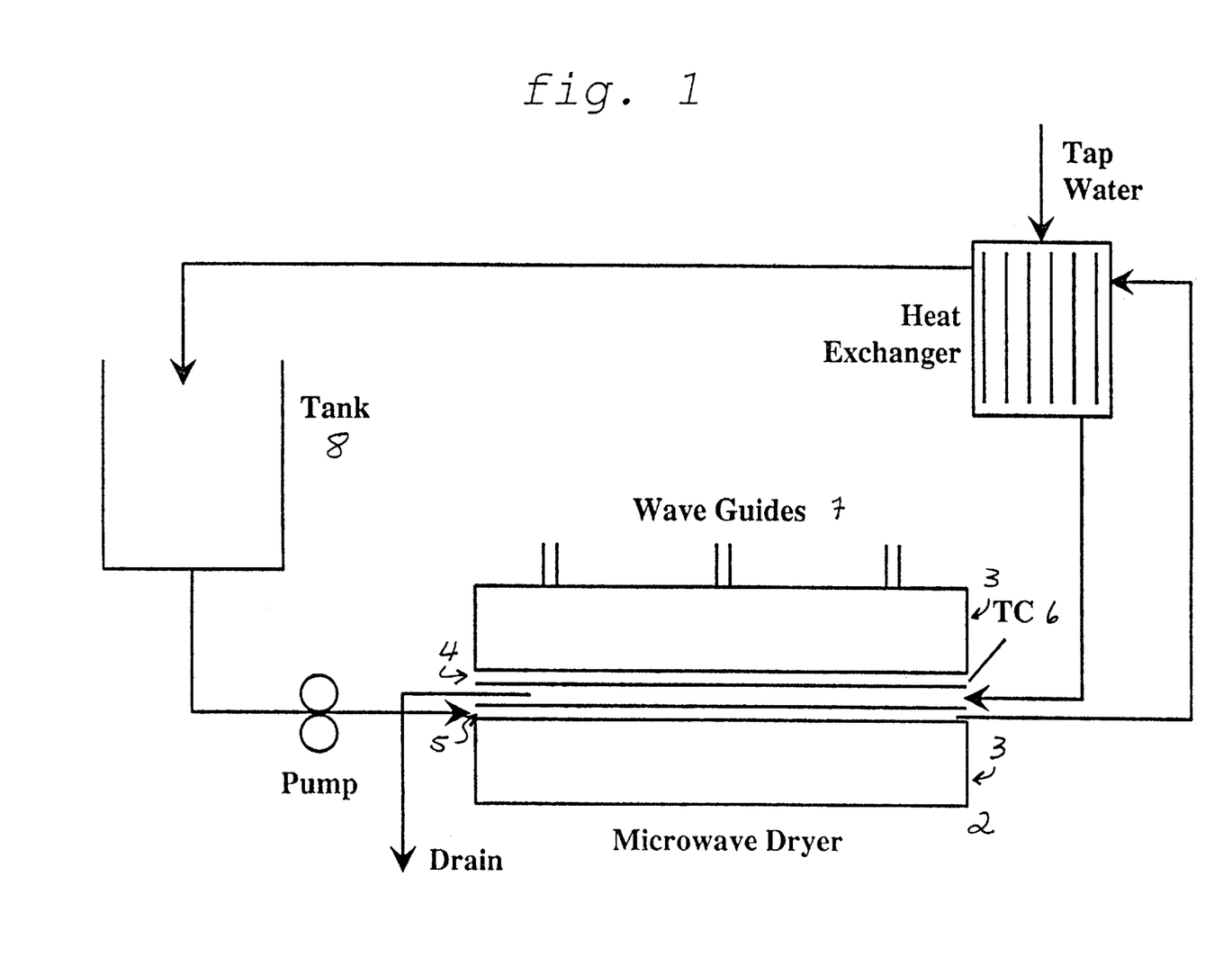
FIG. 1 is a flow sheet diagram illustrative of an effective system for the treatment process.

Experiments were then carried out to test the efficacy of the process on various sample process fluids. The sample fluids were inoculated with *Pediococcus freudeareichii* (*P. freudeareichii*), followed by carrying the fluid stepwise through the procedure (Table 1 summarizes the experimental parameters). Following the process, assays were carried out to evaluate effectiveness based on the reduction of bacteria remaining in the process fluid (a reduction of 1 log as used herein represents a 90% reduction, 2 log a 99% reduction, 3 log a 99.9% reduction, and so forth). In each experiment, 5 gal of feed was charged to the feed tank 8 and inoculated. This charge was circulated through the microwave 2 and heat exchanger 1 for one to two hours to achieve a uniform distribution. The feed was sampled, and the microwave turned on at 72–77 kcal/min (or 5–5.4 kW/min). The exposure time per pass was 87 sec, with one pass equalling the time for 5 gal of fluid to be exposed to the microwaves. Temperature was continuously recorded at the exit from the microwave by computer, and effluent from the heat exchanger was sampled periodically for plate counts.

Figure 4:
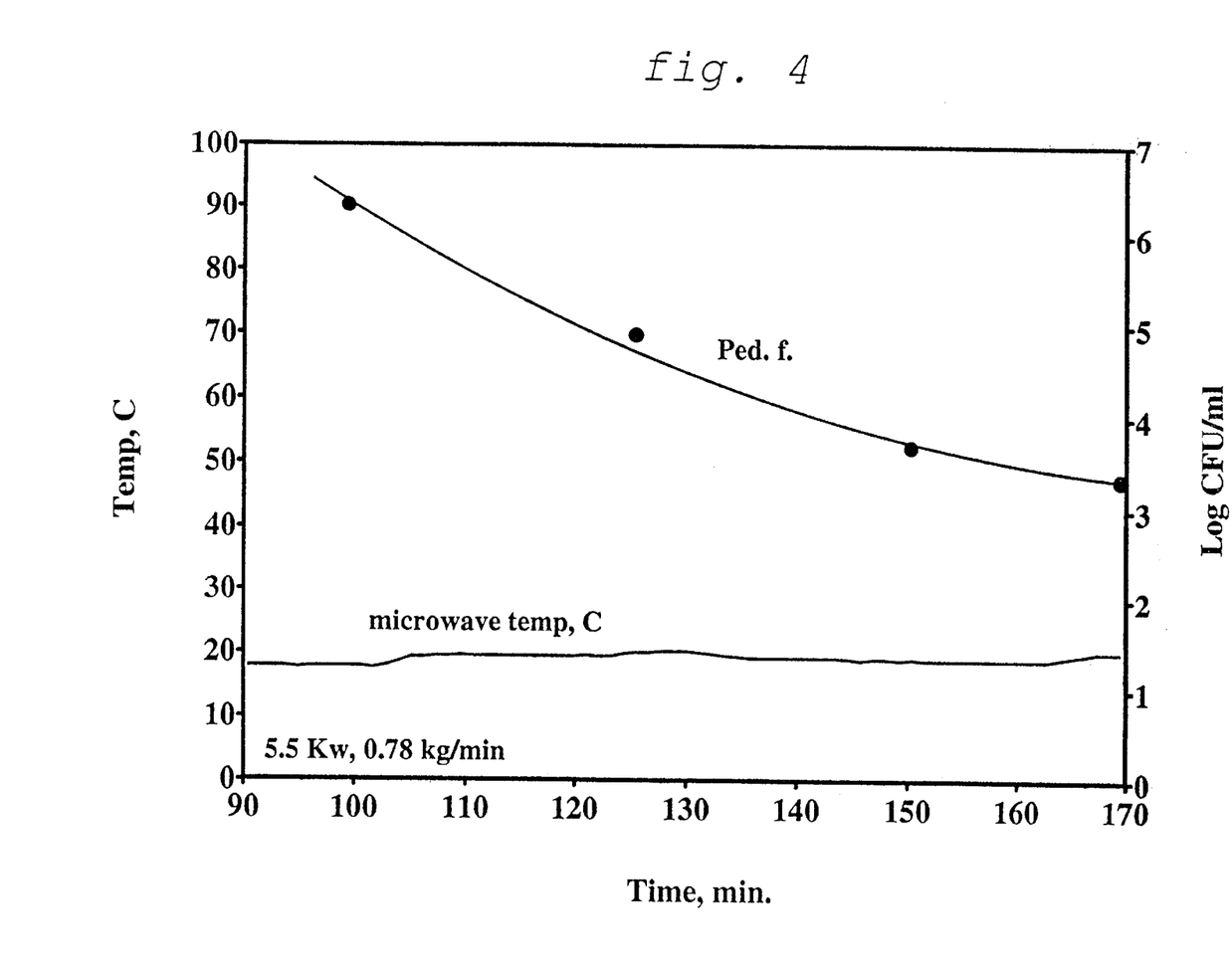
FIG. 4 shows the results obtained with the treatment of water.

Initial experiments utilized with water as the sample process fluid (results are shown in FIG. 4 and Table 1). The level of bacteria dropped 3 logs in 70 min with a total microwave exposure time of 4.2 min. The temperature remained well below normal pasteurization temperatures throughout the run, indicating that microwave energy can kill bacteria with minimum heat treatment in a system where the process fluid was water.

Fruit juice is approximately 10% sugar plus small amounts of other substances such as flavor components, pectin, etc. Therefore, 10% sugar solutions (sucrose and glucose) were substituted for water, and experiments were performed as above. The bacteria level was monitored before turning on the microwave and was found to be evenly distributed and stable. In an experiment with glucose (run #5), the microwave was turned on at 2 hr. There was a 1 log bacteria reduction in 20 min with a total microwave exposure time of 1.16 min and 50 sec exposure per pass. The exit temperature remained below 35° C.

Figure 5:
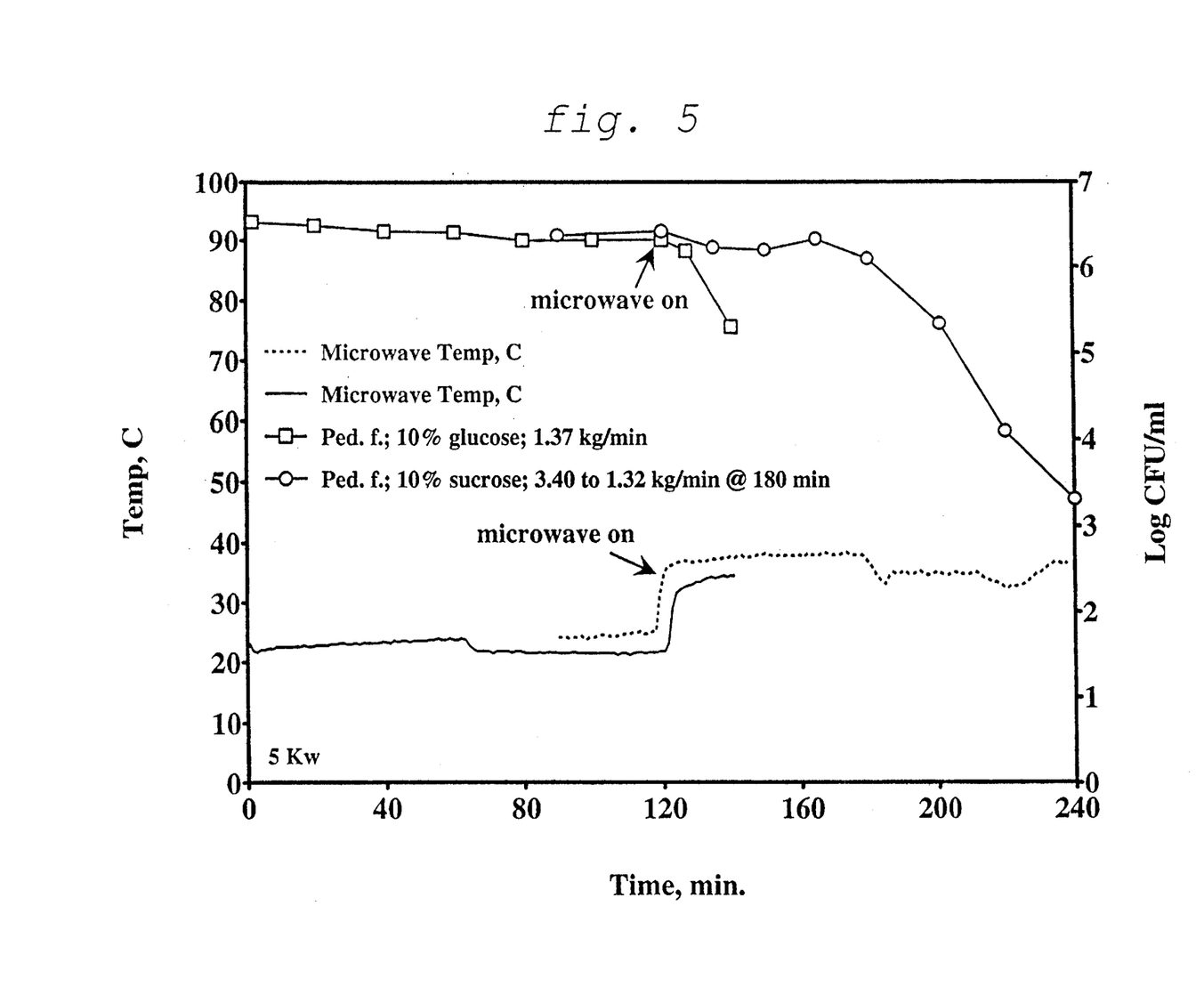
FIG. 5 shows the results obtained with the treatment of sugar solutions.

The experiment was repeated with sucrose (run #7). The initial flow rate yielded an exposure time of 20 sec per pass but there was no reduction in bacterial level (FIG. 5). When the flow rate was reduced so that exposure time was increased to 50 sec per pass (run #8), there was a 3 log reduction with a total microwave exposure time of 3.6 min, indicating a requirement for a minimum exposure time.

A similar experiment was carried out with brine, conductivity 9.5 mhos. There was a 3 log reduction with a total microwave exposure time of 5 min and a 50 sec exposure time per pass (run #10).

Figure 6:
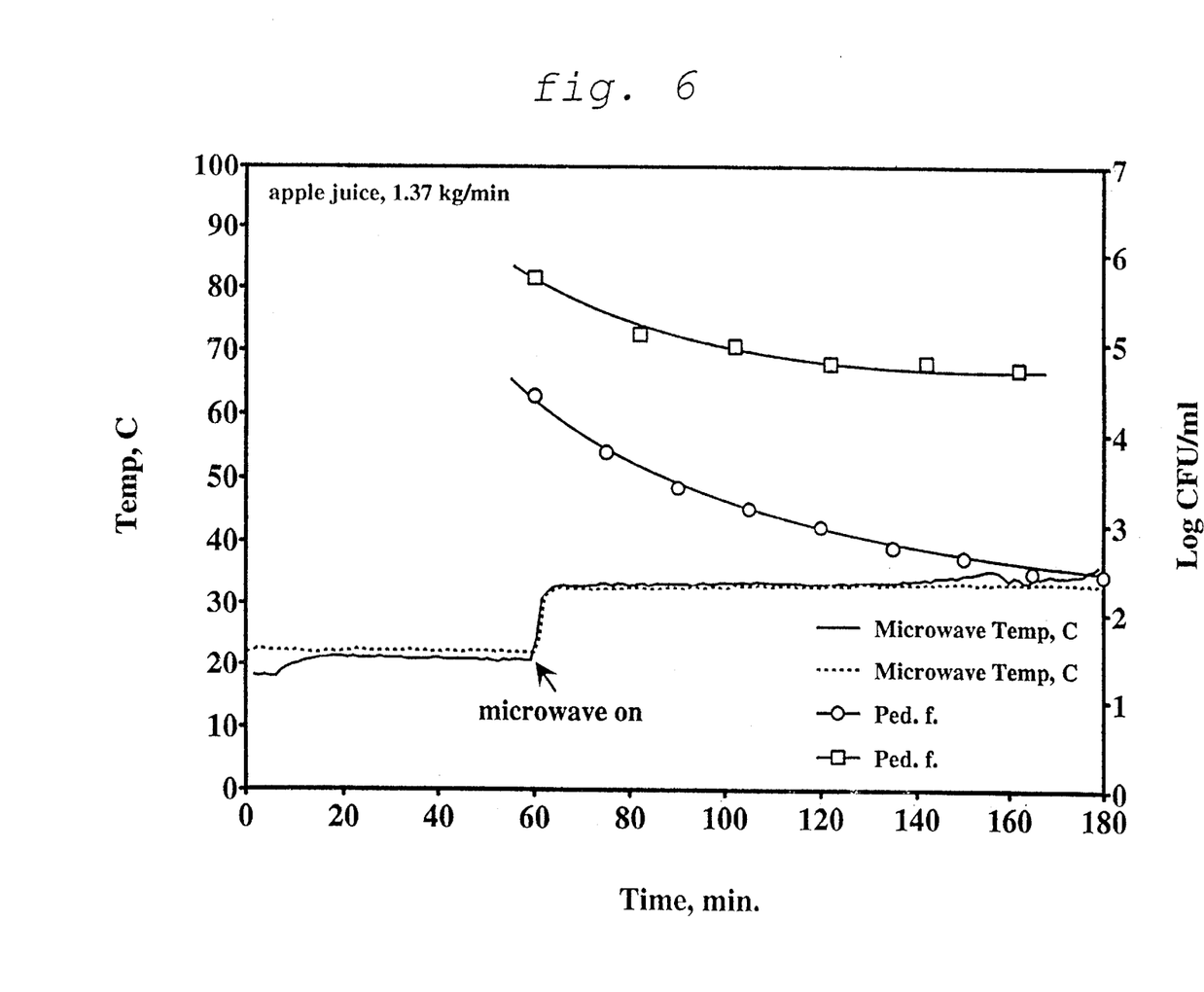
FIG. 6 shows the results obtained with the treatment of apple juice.

It was thus established that microwave energy effectively kills bacteria in water, brine and sugar solutions without significantly heating the bulk liquid. The study was then extended to apple juice (runs #11 and #12) with an exposure time of 50 sec per pass (FIG. 6). There were 1 log and 2 log reductions with temperatures at or near 35° C., indicating that microwave energy is useful for the cold treatment of apple juice as well as other juices.

TABLE 1

Microwave Treatment Results

| Run # | System | Log Kill | Flow Rate, kg/min | μwave Exposure per pass, sec | Total Exposure, min | Total Process Time, min |
|---|---|---|---|---|---|---|
| 1 | Water | 2 | 1.13 | 20.5 | 7.32 | 120 |
| 2 | Water | 3 | 0.78 | 87 | 4.21 | 70 |
| 3 | Water | 3 | 0.76 | 90 | 3.9 | 65 |
| 4 | Glucose | 0.2 | 3.44 | 20 | 3.64 | 60 |
| 5 | Glucose | 1 | 1.37 | 49.7 | 1.16 | 20 |
| 6 | Glucose | 2 | 1.41 | 48.5 | 4.49 | 75 |
| 7 | Sucrose | 0.3 | 3.40 | 20 | 3.57 | 60 |
| 8 | Sucrose | 3 | 1.36 | 50 | 3.60 | 60 |
| 9 | Brine | 0.5 | 3.11 | 22 | 3.61 | 60 |
| 10 | Brine | 3.4 | 1.37 | 49.5 | 4.95 | 90 |
| 11 | Apple Juice | 1 | 1.37 | 49.7 | 1 | 60 |
| 12 | Apple Juice | 2 | 1.37 | 49.5 | 7.18 | 120 |
| 13 | Skim Milk | 0 | 0.85 | 80 | 3.6 | 60 |

Figure 7:
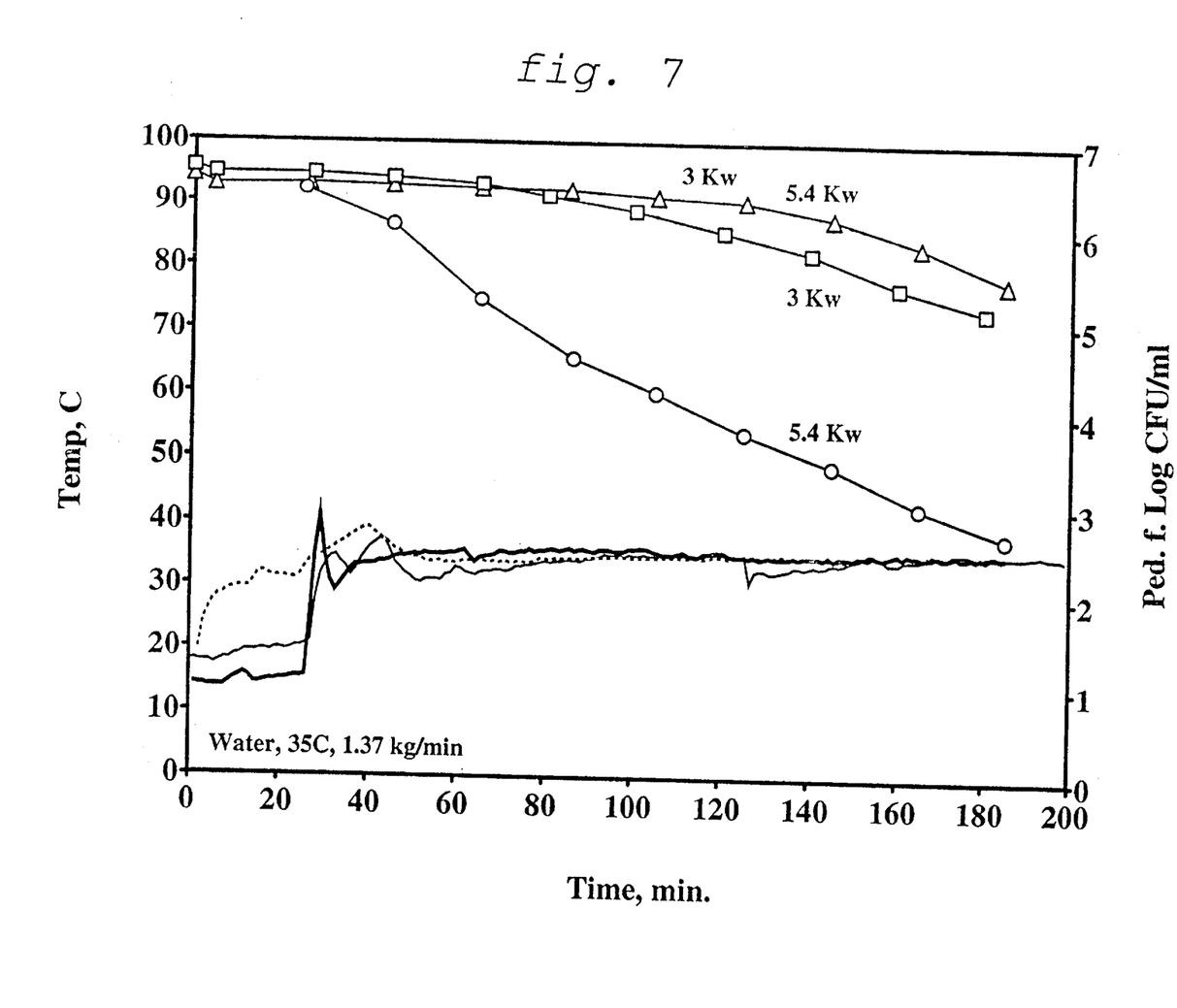
FIG. 7 shows the comparison of bacterial inactivation at two microwave energy levels and the same bulk fluid temperature.

To further investigate the ability of microwave energy to kill bacteria without heat, a series of three additional runs were carried out using water as the process fluid (FIG. 7). In one run there was no cooling; however, a temperature of about 35° C. was maintained by using microwave energy setting of 43 kcal/min. There was minimal bacterial reduction under these conditions, i.e. 1.5 log after 2.5 hr. In a second run, microwave energy was applied at 77 kcal/min with cooling to maintain the bulk fluid temperature at 35° C., resulting in a 3.8 log reduction.

In a third run, the two experiments were combined. Initially, microwave energy was applied at 43 kcal/min with no cooling but at a bulk fluid temperature of 35° C. There was no reduction after 1 hr. Cooling water was added, and the microwave energy was raised to 77 kcal/min. By adjusting the cooling water rate, the bulk fluid temperature was maintained at about 35° C. As shown in FIG. 7, at the same bulk fluid temperature but with higher microwave energy input, the concentration of *P. freudeareichii* was reduced by 1.2 log.

It was thus established that a significant reduction in the microbial population of fluid food products can be achieved by a non-thermal energy treatment, essentially a cold "pasteurization" process. The critical element of the process is the simultaneous application of EME to the process fluid and removal of heat generated by the EME in the fluid. Effective types of EME include microwave and radio frequency energy. The amount and time of EME application sufficient to effectively reduce the microbial population of the process fluid may vary according to the type of EME utilized, the fluid being processed and the level of microbial reduction required. These parameters may be optimized following the experimental guidelines described hereinabove. For example, where the fluid is fruit juice, microwave energy may effectively be applied at a level of about 5.4 kW/min for a period of at least about 5 min. Generally, an effective reduction has been achieved with at least a 1 log reduction. Fluids for which the process is useful are those which benefit from the pasteurization process and include fruit and vegetable juices, beer and egg and egg products. In particular, fluids which are relatively clear, i.e. contain little, if any particulate matter, have been especially successful.

The particular system utilized is not critical to the invention so long as the process fluid remains at a temperature range of no higher than about 50° C., preferably about 40° C. The system illustrated in FIG. 1 has been found to be useful. In this system, process fluid circulates through the annulus and cooling medium circulates counter-current to the process fluid. The process fluid may circulate through the energy-producing section of the system for more than one pass in order for the fluid to be subjected to more than one application of EME. Water is an effective cooling media, however many cooling media are known in the art and would be considered effective for the stated purpose.

The following example is intended only to illustrate the invention and not to limit the scope of the invention which is defined by the claims.

EXAMPLE

Prototype Non-Thermal Treatment System

A double-tube heat exchanger system inside a microwave dryer was utilized. The outer tube was 33.8 mm ID polypropylene which is transparent to EME. The inner tube was 25.4 mm OD stainless steel. Cooling water flowed through the inner tube, and process fluid flowed counter-current through the annulus.

Process fluid was contained in a 190-liter stainless steel tank inoculated with *P. freudeareichii* to achieve a nominal bacteria count of log 6.5 cfu/ml. *P. freudeareichii* was originally inoculated by transferring 2.5–5.0 ml of stock solution into 250–1000 ml TGY broth (5 g tryptone, 1 g glucose, 5 g yeast extract, 1 g $K_2HPO_4$, 11 distilled water) and incubating at 28° C. for 18–24 hr. The bacterial solution reached a final count of 8.0–9.0 log.

A sanitary lobe pump (model #PRED3-1M-UC6-ST-S, TriClover rotary pump, Kenosha, Wis.) controlled the flow rate at 0.77 to 3.4 kg/min. The process fluid went to a 100 kcal/min continuous microwave dryer (Cober Electronics, Inc., Stamford, Conn.). It passed through the microwave in a double pipe heat exchanger. The outer pipe, which contained the process fluid, was a Sanitech-T 1½" sanitary pipe which was 33.8 mm ID and made of polypropylene. The inner pipe was stainless steel with a 25.4 mm OD. Tap water was used as the cooling fluid in the inner pipe. Leaving the microwave, the process fluid went through a plate and frame heat exchanger (model P5VER, DeLaval, Sweden). Tap water was used as the cooling fluid in the heat exchanger and then went to the microwave cooling tube. Cooling water was at a nominal 11.3 kg/min at 20–25° C. After the heat exchanger, the process fluid returned to the feed tank. Samples were taken in the recycle line to the feed tank. The samples were taken in triplicate and plated on TA plates (tryptose agar) and incubated at 37° C. for 18–24 hr. Counts were retrieved using a bacterial colony counter (model 500A, Spiral System Instruments, Inc.

A thermocouple was placed at the exit of the microwave and a fiber optic probe (model 950, Luxtron Fluoroptic Thermometer, Luxtron corp., Santa Clara, Calif.) into the process tube. At normal steady state operating conditions, the probe was slowly moved within the tube over the length of the heating section under the wave guides. The temperature distribution and the corresponding thermocouple reading at the exit are shown in FIG. 2.

We claim:

1. A process for the non-thermal treatment of a liquid food product effective for reducing the microbial population of said food product, wherein said process comprises simultaneously applying electromagnetic energy to and removing thermal energy from said food product.

2. The process of claim 1, wherein said electromagnetic energy is microwave or radio frequency energy.

3. The process of claim 1, wherein sufficient thermal energy is removed from said liquid food product to maintain a temperature of no higher than about 60° C.

4. The process of claim 1, wherein sufficient thermal energy is removed from said liquid food product to maintain a temperature of no higher than about 40° C.

5. The process of claim 1, wherein said thermal energy is removed by means of cooling medium and a heat exchanger.

6. The process of claim 1, wherein said liquid food product is fruit juice, vegetable juice, beer, liquid eggs or liquid egg products.

7. A process for the non-thermal treatment of a liquid food product for reducing the microbial population of said food product, said process comprising
   a) circulating cooling medium through a tube fitted inside an electromagnetic energy-producing source such that an annulus is formed having sufficient volume for the circulation of said food product in a direction which is either countercurrent to or cocurrent with said circulating cooling medium, wherein said tube is constructed of a material which reflects electromagnetic energy and serves as an effective heat exchanger,
   b) circulating said food product through said annulus, and
   c) applying a sufficient amount of electromagnetic energy to reduce the microbial population of said food product, while the food product is circulated through the annulus, and simultaneously removing thermal energy from the liquid food product by means of the cooling medium circulating through the tube.

8. The process of claim 7, wherein said electromagnetic energy is microwave or radio frequency energy.

9. The process of claim 7, wherein sufficient thermal energy is removed from said liquid food product to maintain a temperature of no higher than about 60° C.

10. The process of claim 7, wherein sufficient thermal energy is removed from said liquid food product to maintain a temperature of no higher than about 40° C.

11. The process of claim 7, wherein said liquid food product is fruit juice, vegetable juice, beer, liquid eggs or liquid egg products.

* * * * *